United States Patent [19]
Munson

[11] Patent Number: 5,648,814
[45] Date of Patent: Jul. 15, 1997

[54] METHOD AND APPARATUS FOR OPTIMIZING CAMERA FUNCTION FOR VIDEO CONFERENCING SYSTEMS

[75] Inventor: Bill Munson, Portland, Oreg.

[73] Assignee: Intel Corporation, Santa Clara, Calif.

[21] Appl. No.: 534,473

[22] Filed: Sep. 27, 1995

[51] Int. Cl.⁶ .................................................. H04N 5/232
[52] U.S. Cl. .......................... 348/15; 348/224; 348/229; 348/687; 348/362
[58] Field of Search ................................ 348/15, 14, 223, 348/224, 229, 362, 363, 687, 678, 222; H04N 5/232

[56] References Cited

U.S. PATENT DOCUMENTS 5,400,086   3/1995   Sano et al. .................................. 348/678

FOREIGN PATENT DOCUMENTS 46058      3/1993   Japan ...................... H04N 5/232
219422     8/1993   Japan ...................... H04N 5/232
4-292885   5/1994   Japan ...................... H04N 5/232

*Primary Examiner*—Glenton B. Burgess
*Attorney, Agent, or Firm*—Blakely, Sokoloff, Taylor & Zafman

[57] ABSTRACT

The camera function of a video conferencing system is enhanced such that it will operate in an automatic adjustment mode for brightness and color for only a predetermined period of time, and only at power up and reset. Once the predetermined period of time has elapsed, the camera function "locks down" the operating parameters for brightness and color, and switches to a manual adjustment mode. As a result, video image substantially close to the "ideal image" in brightness and color can be acquired, and yet valuable processor cycles are not wasted in compensating for temporal foreground changes, but instead made available to sustain better frame rates.

20 Claims, 4 Drawing Sheets

METHOD AND APPARATUS FOR OPTIMIZING CAMERA FUNCTION FOR VIDEO CONFERENCING SYSTEMS

BACKGROUND OF THE INVENTION

1. Field of the Invention

The present invention relates to the field of personal computer (PC) conferencing. More specifically, the present invention relates to the cameras employed by PC conferencing systems.

2. Background Information

PC video conferencing systems are known in the art. Typically, under the prior art, PC video conferencing systems employ cameras that provide two modes of adjustments for the video image's brightness (i.e. exposure) and for color balance (i.e. daylight vs incandescent vs fluorescent). The two modes are automatic and manual. Under the automatic mode, the brightness and color balance are adjusted continuously to achieve an "ideal image", whereas under the manual mode, the brightness and color balance are adjusted under the control of the user. Most video conferencing systems are set up with the automatic mode as the default mode of operation. Some cameras provide a manual mode as the alternate mode if the user chooses to intervene.

This conventional approach was probably carried over from the general field of photographic cameras where the automatic mode is preferred by the overwhelming majority, i.e. the novice photographers, and the manual mode is preferred by the small minority, i.e. the sophisticated or professional photographers. This conventional approach worked just fine for photography applications, since there isn't a lot of disadvantage in having the photographic camera constantly adjusting for the "ideal picture".

However, the situation in video conferencing is different. Experience has shown that the overwhelming majority of video conferencing users do not want to intervene in adjusting the brightness and/or color balance of the video image. After all, the user's main business is to participate in the video conference in progress. As a result, most video conferencing cameras are left to operate in the automatic mode. While the background behind a video conferencing user remains typically unchanged, the foreground tends to be constantly changing because of the user's hand gesture as he/she speaks or because of the shuffling of papers referred to by the user, during the life of a video conference. These foreground changes cause the camera to continually adjust the image's brightness and color balance, which affects the brightness and color of the background. Unfortunately, this kind of continuous changes has a significant disadvantage in video conferencing application. These changes in the background are interpreted as motion by the video compression algorithm, leading to a lower compression rate, and ultimately fewer video frames per second to the video conference user.

Thus, it is desirable to have a better approach for the camera function of a video conferencing system to adjust for brightness and color balance. As will be disclosed in the more detail below, the present invention achieves these and other desirable results.

SUMMARY OF THE INVENTION

The camera function of a video conferencing system is enhanced such that it will start up operation at power on and reset with a set of "last used" operating parameters and in an automatic adjustment mode for brightness and color balance. The camera function will stay operating in the automatic adjustment mode for only a predetermined period of time. Once the predetermined period of time has elapsed, the camera function "locks down" the operating parameters for brightness and color balance, and switches to a manual adjustment mode. The length of the predetermined period of time is set to an empirically determined value where under most video conferencing settings, the video image would have been stabilized. If no manual adjustments are received during the remainder of the video conferencing session, the newly locked down operating parameters become the "last used" operating parameters for the next session. However, if manual adjustments are provided by the user, the locked down operating parameters are updated, and the updated operating parameters become the "last used" operating parameters for the next session.

In one embodiment, the camera function includes a non-volatile read/write memory for storing the default operating parameters for the "ideal image", the length of the predetermined period of time the camera function is to operate in automatic adjustment mode at power up/reset, and the "locked down"/"last used" operating parameters. The camera function further includes a microcontroller for controlling the other components of the camera function in accordance to these stored values.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention. Furthermore, for the method steps of the present invention, for ease of explanation, certain method steps are described with multiple method steps "in sequence", however, they should not be construed as necessarily order dependent in their performance.

Figure 1:
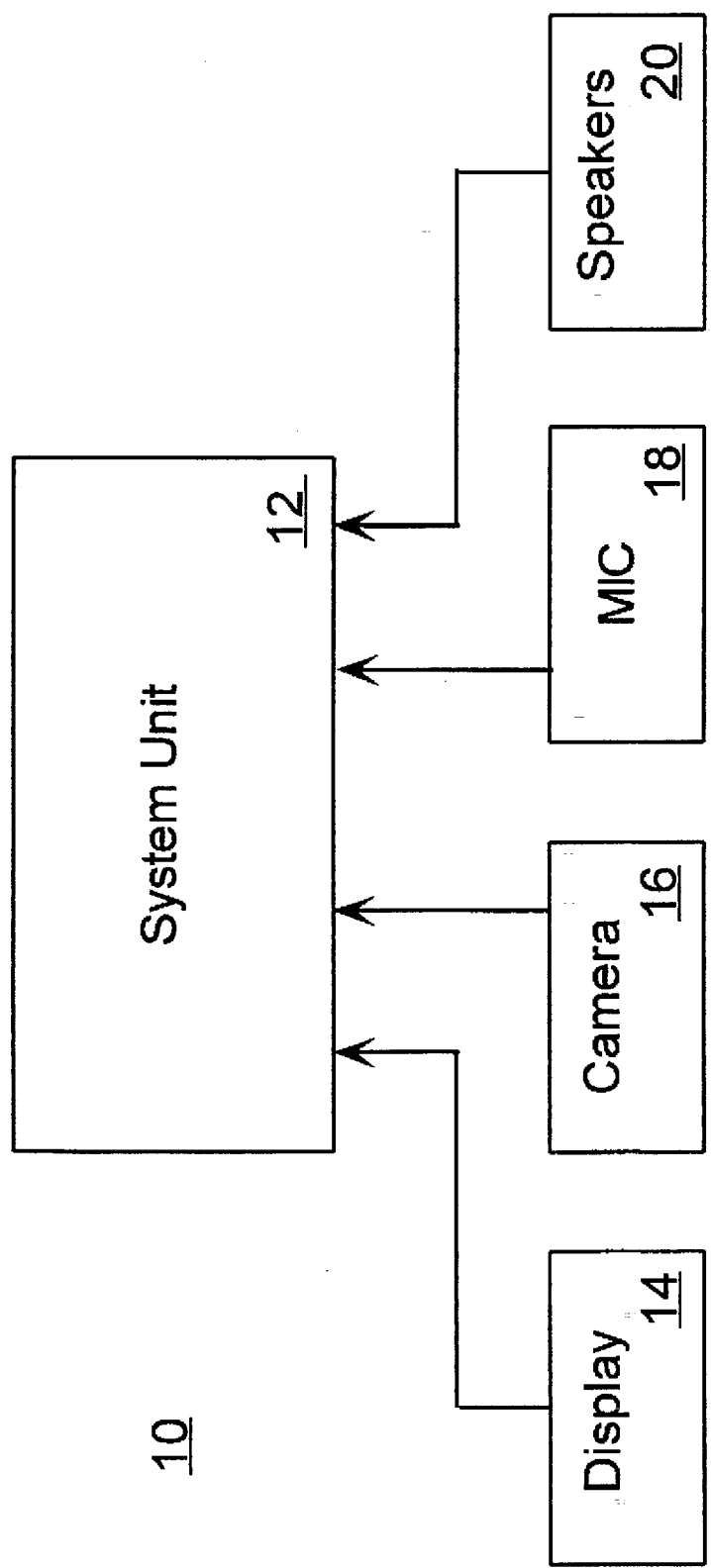
FIG. 1 illustrates an exemplary PC conference system incorporating the teachings of the present invention.

Referring now to FIG. 1, wherein an exemplary video conferencing system 10 incorporating the teachings of the present invention is shown. As illustrated, video conferencing system 10 comprises system unit 12, video display 14, camera 16, microphone 18 and speakers 20 coupled to each other as shown.

System unit 12 performs its conventional function of executing an conferencing application, and processing of audio and video data, including their compression and decompression. System unit 12 is intended to represent a broad category of computer systems known in the art, including but not limited to computer systems based on Intel Architecture processors, manufactured by Intel Corporation of Santa Clara, Calif., assignee of the present invention.

Video display 14 is used to display data and video images. Video display 14 is also intended to represent a broad category of displays known in the art. Camera 16 is used to capture and convert video images of the user of exemplary system 10 into signals for system unit 12. In particular, camera 16 incorporates the teachings of the present invention for optimizing brightness and color balance adjustments to video images, which will be described more fully below.

Microphone 18 and speakers 20 perform their conventional functions of capturing and rendering audio. Similar to video display 14, microphone 18 and speakers 20 are also intended to represent a broad category of these elements found in video conferencing systems.

While for ease of explanation, video display 14, camera 16, microphone 18, and speakers 20 are being illustrated as separate functional blocks. However, those skilled in the art will appreciate that these functions may be combined and embodied in the same physical unit in any number of ways. For examples, microphone 18 and speakers 20 may be embodied in one single "headset", whereas video display 14 and camera 16 may be embodied in a single display with "hidden" camera.

Figure 2:
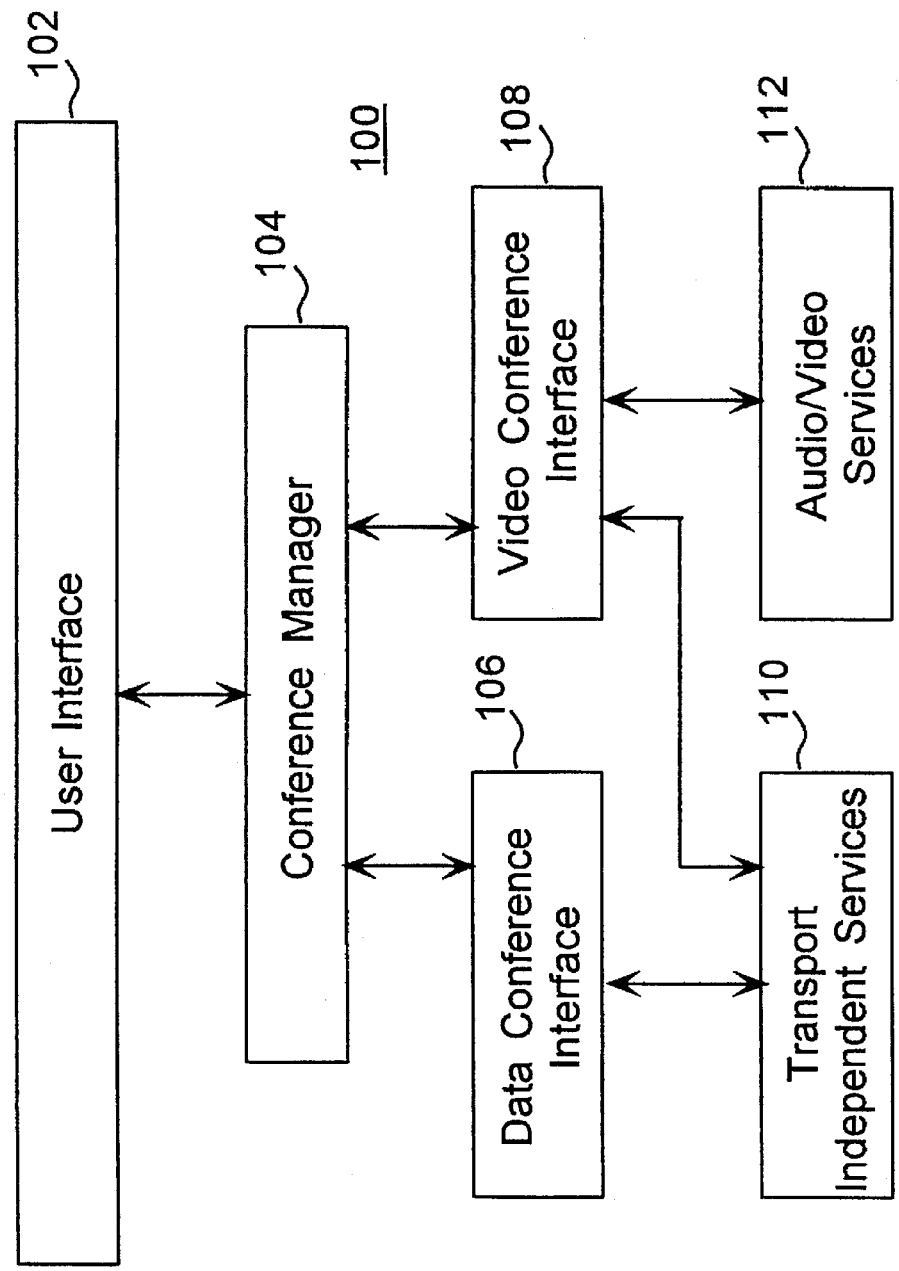
FIG. 2 illustrates one embodiment of an exemplary conferencing application executing in system unit of FIG. 1.

Before describing camera 16 in detail, we will first refer briefly to FIG. 2, wherein an exemplary conferencing application executing on system unit 12 is illustrated. As shown, exemplary conferencing application 100 comprises user interface 102, conference manager 104, transport independent services 110, extended A/V services 112, and an "integrated" data and video interfaces 106 and 108 to these services 110 and 112.

User interface 102 provides display windows with menus, buttons etc. for interacting with a user. Conference manager 104 manages personal conferences, including connection and termination services. Transport independent services 110 provide connection services on multiple transport media and multiple connections. A/V services 112 provide sampling, digitization, compression/decompression of audio signals exchanged, as well as capture and playback services for video streams including interfacing with the proper CODEC to compress and decompress the video signals. Integrated interfaces 106 and 108 provide abstraction of these transport and A/V services, enabling the serviced conferencing application to perform call management, data and/or file channel management, and A/V streams management. In one embodiment, data conferencing interface 106 supports ITU's T.120 protocol, whereas video conferencing interface 108 supports ITU's H.320 protocol. These and other related services are known in the art, and therefore will not be described in further detail.

Figure 3:
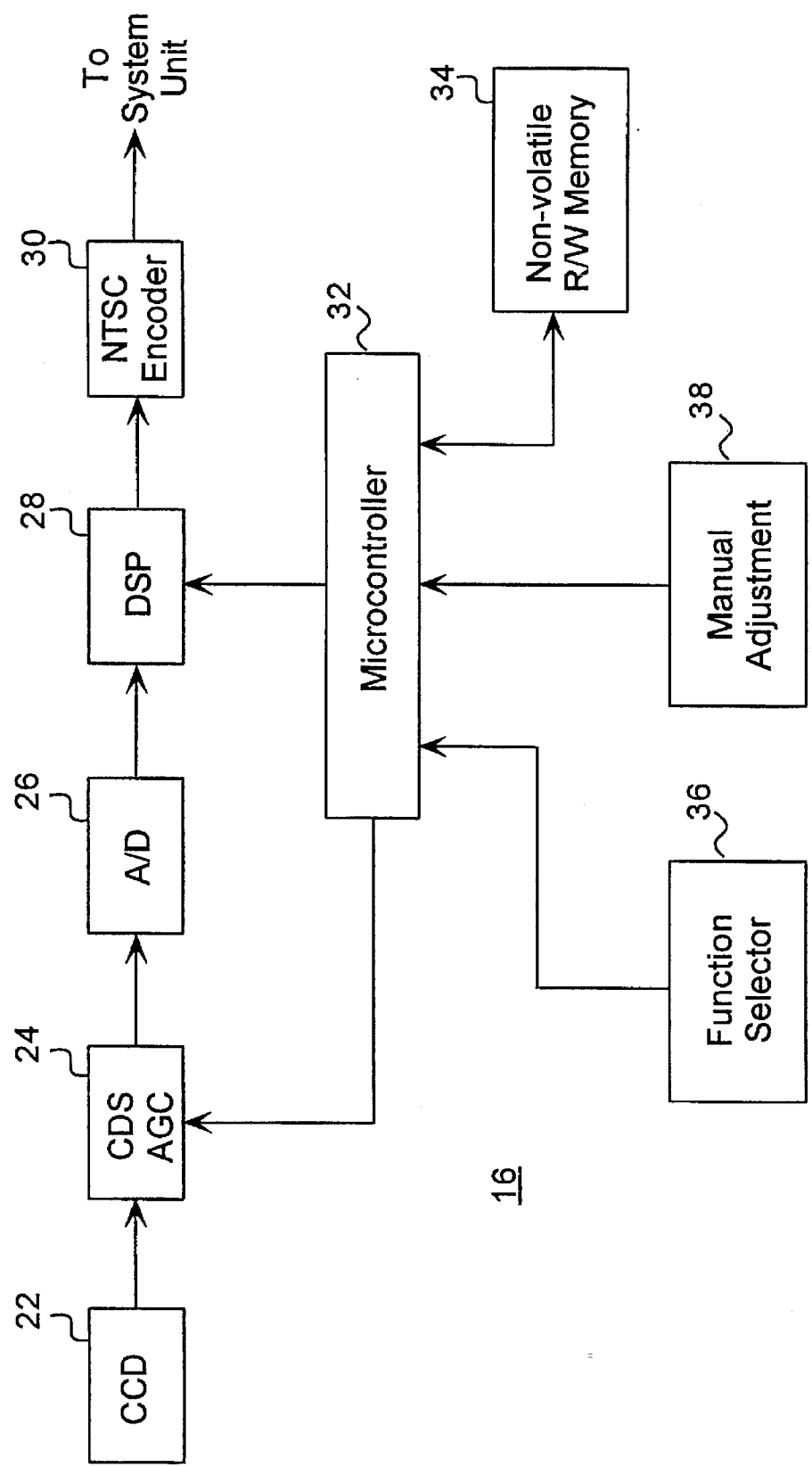
FIG. 3 illustrates one embodiment of the camera function of FIG. 1.

FIG. 3 illustrates one embodiment of camera 16. As shown, camera 16 comprises charge coupled device (CCD) 22, automatic gain control (AGC) with correlated double sampling (CDS) 24, analog to digital converter (A/D) 26, digital signal processor (DSP) 28, and NTSC encoder 30, coupled to each other as shown. CCD 22 is used to capture user images and outputs them as analog signals. AGC/CDS 24 "preprocesses" and adjusts the analog image signal levels, including its brightness. A/D converter 26 converts the analog signals into digital form, and DSP 28 performs image processing functions and organizes them into video signals. Finally NTSC encoder 30 encodes them into the NTSC format.

Additionally, camera 16 includes microcontroller 32 for controlling the operation of the above enumerated elements 22–30. Microcontroller 32 controls the operation of the enumerated elements 22–30 in one of two modes, an automatic mode and a manual mode. Under the automatic mode, microcontroller 32 continually adjusts the brightness and color balance of video images, so they are as close to the "ideal images" as possible, whereas under the manual mode, microcontroller 32 adjusts the brightness and color balance of the video images, only in response to direct instructions from the user.

More importantly, microcontroller 32 incorporates the teachings of the present invention, and optimizes its control of AGC/CDS 24 in the areas of brightness and color balance adjustments by operating in the automatic mode only for a predetermined amount of time, and only upon power on or reset. Upon expiration of the predetermined amount of time, microcontroller 32 locks down the operating parameters at the time, and switches to manual mode. The length of the predetermined amount of time is sufficient long to allow the video images to stabilize for most video conferencing environments. The time value is empirically determined. In one embodiment, the time period is set to 10 secs. The operating flow of microcontroller 32 will be described in more detail below.

Camera 16 also includes non-volatile read/write memory 34 for storing the operating parameters, including brightness and color balance parameters, for the "ideal picture". Non-volatile memory 34 is also used to store the "last used" version of these brightness and color balance parameters, which could be a "locked down" version or an "updated version", to be described more fully below. Finally, non-volatile memory 34 is also used to store the time value denoting the length of the predetermined time period camera 16 is to operate in automatic mode, before switching to manual mode.

Lastly, camera 16 includes function selector 36 for selecting one of a number of video image characteristics for adjustment, including brightness and color balance, and manual adjustment 38 (such as up arrow and down arrow) for denoting the amount of adjustments for the selected characteristic.

Figure 4:
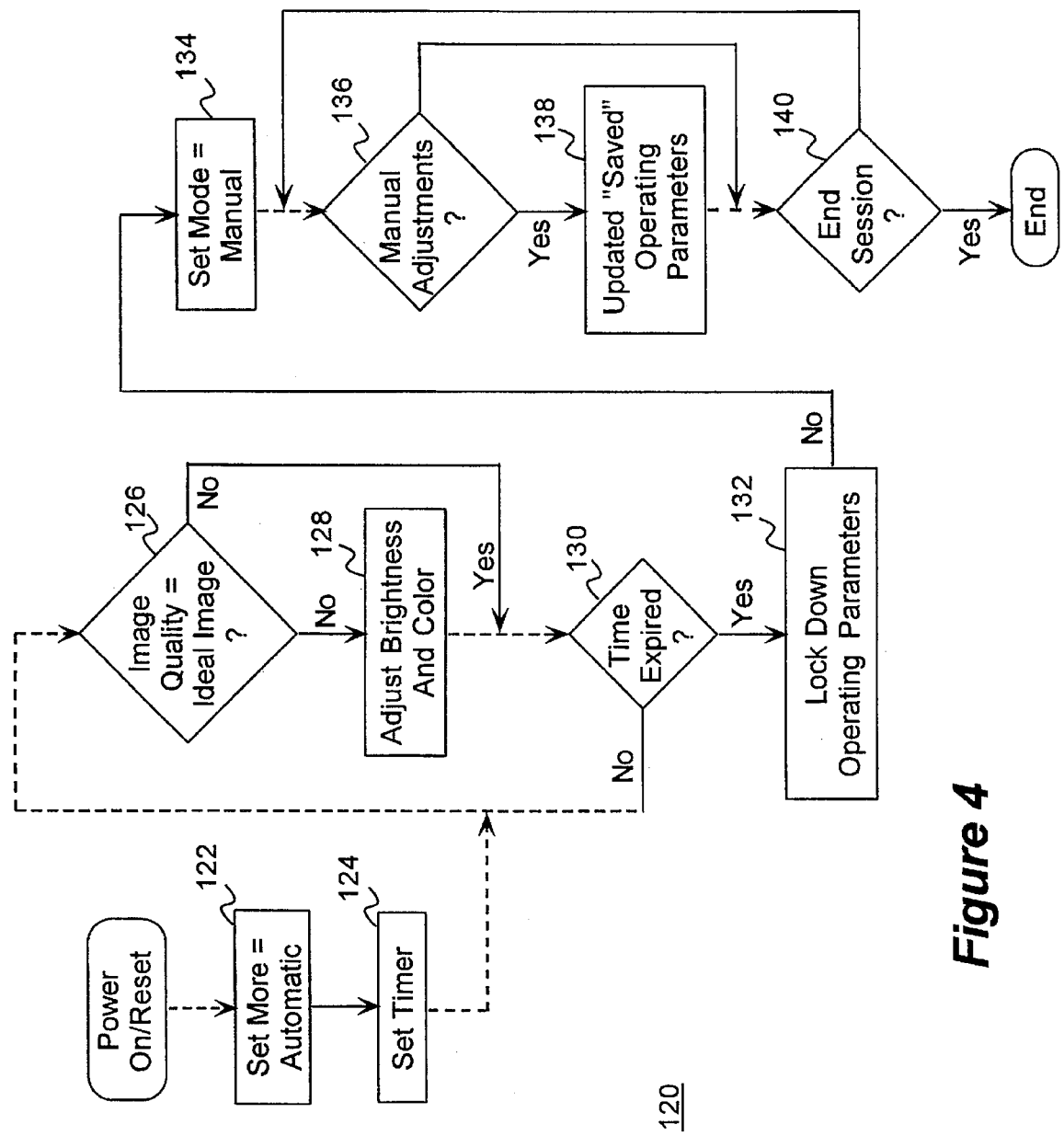
FIG. 4 illustrates one embodiment of the operational flow of the microcontroller of FIG. 3.

FIG. 4 illustrates one embodiment of the operation flow of microcontroller 32. As shown, at power on or reset, as part of the initial power on/reset steps, microcontroller 32 starts operating camera 16 using a set of "last used" operating parameters and in automatic adjustment mode, step 122. Microcontroller 32 also sets a timer to expire after a predetermined amount of time has elapsed, in accordance with the time value stored in non-volatile memory 34.

Microcontroller 32 then operates camera 16 in this initial period in the automatic adjustment mode. During this period, as part of the normal operation, microcontroller 32 continuously checks and determines if the image quality is "the same" as the "ideal image", step 126. If the image quality is "the same" as the "ideal image", microcontroller 32 continues operation without making any adjustments. Otherwise, microcontroller 32 adjusts brightness and color balance as appropriate.

As part of the operation during this phase, microcontroller 32 also checks and determines if the timer has expired, step 130. If the timer has not expired, microcontroller 32 continues operation as described earlier. On the other hand, if the timer has expired, microcontroller 32 transitions to a new phase of operation. As part of the transitioning steps, microcontroller 32 locks down the current operating parameters, step 132. Furthermore, microcontroller 32 sets the operating mode to manual, and switches to operate camera 16 in the manual adjustment mode. In other words, microcontroller 32 stops automatically adjusting the operating characteristics of camera 16 unless the user intervenes and instructs camera 16 to do so.

While operating in the manual mode, microcontroller 32 monitors for user selection of either brightness and color balance for adjustment, and the adjustment amount the user provides for the selected characteristic, step 136. If no manual adjustments are received, the "locked down" operating parameters become the "last used" operating parameters for the next session. However, if manual adjustments are received, the "locked down" operating parameters are updated, step 138, and the last updated operating parameters become the set of "last used" operating parameters for the next session.

As a result, user of video conferencing systems can acquire image quality that is substantially close to the "ideal quality", however the camera is prevented from causing the system unit to consume valuable processor cycles in compensating for temporal foreground changes. In turn, by virtue of the saved processor cycles, better frame rate is sustained, leading to better image quality in terms of "full motion". Experience has shown that users of video conferencing systems consider "full motion" images, even with a slight compromise in brightness and/or color balance, to be of better quality.

Thus, a method and apparatus for optimizing camera function in a video conferencing system has been described. While the method and apparatus of the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. A video conferencing camera comprising a microcontroller that starts operation of the camera at power on and reset using a set of last used operating parameters and in a first automatic mode wherein the microcontroller continuously make adjustments to video images for brightness and color balance for a predetermined amount of time, and then switches to a second manual mode wherein the microcontroller ceases to make any adjustment to video images for brightness and color balance unless a video conferencing user intervenes and instructs the video conferencing camera to do so directly.

2. The video conferencing camera as set forth in claim 1, wherein the video conferencing camera further comprises a first non-volatile memory for storing a value for the predetermined amount of time the microcontroller is to operate the video conferencing camera in the automatic mode at power on and reset.

3. The video conferencing camera as set forth in claim 1, wherein the video conferencing camera further comprises a first non-volatile memory for storing a locked down version of brightness and color balance operating parameters at the expiration of the predetermined time period.

4. The video conferencing camera as set forth in claim 3, wherein if no manual adjustments are received during the manual mode, the locked down version of brightness and color balance operating parameters becomes the set of last used operating parameters for a next video conferencing session.

5. The video conferencing camera as set forth in claim 3, wherein if manual adjustments are received during the manual mode, the locked down version of brightness and color operating parameters are updated, and the last updated version becomes the set of last used operating parameters for a next video conference session.

6. A video conferencing system comprising
a system unit executing a conferencing application having video services which include compression and decompression of video data;
a camera function coupled to the system unit for providing video images in digital signal form to the system unit, wherein the camera function includes a microcontroller that starts operation of the camera at power on or reset in a first automatic mode, under which the microcontroller continuously make adjustments to video images for brightness and color balance, for a predetermined amount of time, and then switches to a second manual mode, under which the microcontroller ceases to make any adjustment to video images for brightness and color balance, unless a video conferencing user intervenes and instructs the video conferencing camera to do so directly.

7. The video conferencing system as set forth in claim 6, wherein the video conferencing camera further comprises a first non-volatile memory for storing a value for the predetermined amount of time the microcontroller is to operate the video conferencing camera in the automatic mode at power on and reset.

8. The video conferencing system as set forth in claim 6, wherein the video conferencing camera further comprises a first non-volatile memory for storing a locked down version of brightness and color balance operating parameters at the expiration of the predetermined time period.

9. The video conferencing system as set forth in claim 8, wherein if no manual adjustments are received during the manual mode, the locked down version of brightness and color balance operating parameters becomes the set of last used operating parameters for a next video conferencing session.

10. The video conferencing system as set forth in claim 8, wherein if manual adjustments are received during the manual mode, the locked down version of brightness and color operating parameters are updated, and the last updated version becomes the set of last used operating parameters for a next video conference session.

11. In a video conferencing system, a method for optimizing a camera function of the video conferencing system, the method comprising the steps of:

a) operating the camera function at power on and reset using a set of last used operating parameters and in a first automatic mode, under which brightness and color balance of video images are continuously adjusted, for a predetermined period of time; and b) operating the camera function in a second manual mode, under which brightness and color balance of video images are not adjusted, unless a video conference user intervenes and commands such adjustments directly, upon expiration of the predetermined period of time.

12. The method as set forth in claim 11, wherein the predetermined amount of time of step (a) is determined in accordance to a time value prestored in a nonvolatile memory of the camera function.

13. The method as set forth in claim 11, wherein step (b) further comprises locking down a version of brightness and color balance operating parameters at the expiration of the predetermined time period in a non-volatile memory of the camera function.

14. The method as set forth in claim 13, wherein the method further comprises step (c) if no manual adjustments are received during the manual mode, leaving the locked down version of brightness and color balance operating parameters as the set of last used operating parameters for a next video conferencing session.

15. The method as set forth in claim 13, wherein the method further comprises the step (c) if manual adjustments are received during the manual mode, updating the locked down version of brightness and color operating parameters, and leaving the last updated version as the set of last used operating parameters for a next video conference session.

16. An apparatus comprising a camera function having a microcontroller that starts operation of the camera at power on and reset using a set of last used operating parameters and in a first automatic mode wherein the microcontroller continuously make adjustments to video images for brightness and color balance for a predetermined amount of time, and then switches to a second manual mode wherein the microcontroller ceases to make any adjustment to video images for brightness and color balance unless a user intervenes and instructs the camera function to do so directly.

17. The apparatus as set forth in claim 16, wherein the camera function further comprises a first non-volatile memory for storing a value for the predetermined amount of time the microcontroller is to operate the camera function in the automatic mode at power on and reset.

18. The apparatus as set forth in claim 16, wherein the camera function further comprises a first non-volatile memory for storing a locked down version of brightness and color balance operating parameters at the expiration of the predetermined time period.

19. The apparatus as set forth in claim 18, wherein if no manual adjustments are received during the manual mode, the locked down version of brightness and color balance operating parameters becomes the set of last used operating parameters for a next session.

20. The apparatus as set forth in claim 18, wherein if manual adjustments are received during the manual mode, the locked down version of brightness and color operating parameters are updated, and the last updated version becomes the set of last used operating parameters for a next session.

* * * * *